(12) United States Patent
Kirkland et al.

(10) Patent No.: US 6,674,440 B1
(45) Date of Patent: Jan. 6, 2004

(54) GRAPHICS PROCESSOR FOR STEREOSCOPICALLY DISPLAYING A GRAPHICAL IMAGE

(75) Inventors: Dale Kirkland, Madison, AL (US); James Deming, Madison, AL (US)

(73) Assignee: 3Dlabs, Inc., Inc. Ltd., Hamilton (BM)

( * ) Notice: Subject to any disclaimer, the term of this patent is extended or adjusted under 35 U.S.C. 154(b) by 0 days.

(21) Appl. No.: 09/533,158

(22) Filed: Mar. 23, 2000

Related U.S. Application Data

(60) Provisional application No. 60/127,789, filed on Apr. 5, 1999.

(51) Int. Cl.[7] .................. G06T 15/00; G06F 15/16; G09G 5/00
(52) U.S. Cl. .................. 345/503; 345/611; 345/674; 345/419
(58) Field of Search ............... 345/419, 611, 345/619, 674, 441, 443, 501, 503

(56) References Cited

U.S. PATENT DOCUMENTS

| | | | |
|---|---|---|---|
| 4,434,437 A | 2/1984 | Strolle et al. | 358/140 |
| 4,615,013 A | 9/1986 | Yan et al. | 364/521 |

(List continued on next page.)

FOREIGN PATENT DOCUMENTS

| | | |
|---|---|---|
| EP | 0 311 798 A2 | 4/1989 |
| EP | 0 397 180 A2 | 11/1990 |
| EP | 406 084 A2 | 2/1991 |
| EP | 0 438 194 A2 | 7/1991 |
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| JP | 7021406 | 1/1995 |
| WO | WO 86/07646 | 12/1986 |
| WO | WO 92/00570 | 1/1992 |
| WO | WO 93/06553 | 4/1993 |
| WO | WO 96/41311 | 12/1996 |
| WO | WO 97/21192 | 6/1997 |

OTHER PUBLICATIONS

"A Fine Grained Data Flow Machine and Its Concurrent Execution Mechanism," Iwashita et al., C&C Information Technology Research Labs, Apr. 1989, pp. 63–72.

"A Dataflow Image Processing System TIP–4," Fujita et al., C&C Information Technology Research Labs, NEC Corporation, Sep. 1989, pp. 735–741.

"Processing the New World of Interactive Media," Rathman, The Trimedia VLIW CPU Architecture, Mar. 1998, pp. 108–117.

(List continued on next page.)

*Primary Examiner*—Ulka J. Chauhan
(74) *Attorney, Agent, or Firm*—Arnall Golden Gregory LLP (57) ABSTRACT

A method, computer program product, and graphics processor for stereoscopically displaying a primitive on a display device adds a row of pixels to the primitive to improve its appearance on the display device. To that end, it first is determined if the primitive is to be stereoscopically displayed on the display device. After it is determined that the primitive is to be stereoscopically displayed, then a row of pixels is added to the primitive. The primitive preferably is a point primitive or a line primitive.

33 Claims, 8 Drawing Sheets

U.S. PATENT DOCUMENTS

| | | | |
|---|---|---|---|
| 4,646,232 A | 2/1987 | Chang et al. | 364/200 |
| 4,833,462 A | 5/1989 | Gover et al. | 340/709 |
| 4,908,780 A | 3/1990 | Priem et al. | 364/521 |
| 4,918,626 A | 4/1990 | Watkins et al. | 364/522 |
| 4,991,122 A | 2/1991 | Sanders | 364/521 |
| 5,083,217 A * | 1/1992 | Kumamoto | 358/452 |
| 5,107,415 A | 4/1992 | Sato et al. | 395/800 |
| 5,123,085 A | 6/1992 | Wells et al. | 395/121 |
| 5,239,654 A | 8/1993 | Ing-Simmons et al. | 395/800 |
| 5,287,438 A | 2/1994 | Kelleher | 395/132 |
| 5,293,480 A | 3/1994 | Miller et al. | 395/163 |
| 5,313,551 A | 5/1994 | Labrousse et al. | 395/425 |
| 5,363,475 A | 11/1994 | Baker et al. | 395/122 |
| 5,371,840 A | 12/1994 | Fischer et al. | 395/133 |
| 5,394,524 A | 2/1995 | DiNicola et al. | 395/163 |
| 5,398,328 A | 3/1995 | Weber et al. | 395/500 |
| 5,410,331 A | 4/1995 | Schuneman | 345/150 |
| 5,446,479 A | 8/1995 | Thompson et al. | 345/139 |
| 5,485,559 A | 1/1996 | Sakaibara et al. | 395/133 |
| 5,511,165 A | 4/1996 | Brady et al. | 395/200.01 |
| 5,519,823 A | 5/1996 | Barkans | 395/143 |
| 5,544,294 A | 8/1996 | Cho et al. | 395/141 |
| 5,555,359 A | 9/1996 | Choi et al. | 395/141 |
| 5,557,734 A | 9/1996 | Wilson | 395/162 |
| 5,561,749 A | 10/1996 | Schroeder | 395/120 |
| 5,572,713 A | 11/1996 | Weber et al. | 395/500 |
| 5,629,720 A | 5/1997 | Cherry et al. | 345/119 |
| 5,631,693 A | 5/1997 | Wunderlich et al. | 348/7 |
| 5,651,107 A | 7/1997 | Frank et al. | 395/344 |
| 5,664,114 A | 9/1997 | Krech, Jr. et al. | 395/200.64 |
| 5,666,520 A | 9/1997 | Fujita et al. | 345/513 |
| 5,684,939 A | 11/1997 | Foran et al. | 395/131 |
| 5,701,365 A | 12/1997 | Harrington et al. | 382/212 |
| 5,706,481 A | 1/1998 | Hannah et al. | 395/519 |
| 5,721,812 A | 2/1998 | Mochizuki | 395/110 |
| 5,737,455 A | 4/1998 | Harrington et al. | 382/284 |
| 5,757,375 A | 5/1998 | Kawase | 345/429 |
| 5,757,385 A | 5/1998 | Narayanaswami et al. | 345/505 |
| 5,764,237 A | 6/1998 | Kaneko | 345/430 |
| 5,821,950 A | 10/1998 | Rentschler et al. | 345/505 |
| 5,841,444 A | 11/1998 | Mun et al. | 345/506 |
| 5,870,567 A | 2/1999 | Hausauer et al. | 395/281 |
| 5,883,641 A | 3/1999 | Krech, Jr. et al. | 345/505 |
| 5,886,701 A * | 3/1999 | Chauvin et al. | 345/418 |
| 5,914,711 A | 6/1999 | Mangerson et al. | 345/203 |
| 5,982,375 A * | 11/1999 | Nelson et al. | 345/419 |
| 6,091,419 A * | 7/2000 | Kim | 345/419 |
| 6,108,005 A * | 8/2000 | Starks et al. | 345/419 |
| 6,295,070 B1 * | 9/2001 | Wood | 345/582 |

OTHER PUBLICATIONS

"Effective Cache Mechanism for Texture Mapping," IBM Technical Disclosure Bulletin, vol. 39, No. 12, Dec. 1996, pp. 213–217.

"Advanced Raster Graphics Architecture," XP–002118066, pp. 890–893.

"Data–Format Conversion: Intel/Non–Intel," vol. 33, No. 1A, Jun. 1990, IBM Technical Disclosure Bulletin, pp. 420–427.

"Address Munging Support in a Memory Controller/PCI Host Bridge for the PowerPC 603 CPU Operating in 32–Bit Data Mode," IBM Technical Disclosure Bulletin, vol. 38, No. 09, Sep. 1995, pp. 237–240.

"One Frame Ahead: Frame Buffer Management for Animation and Real–Time Graphics," XP–000749898, Auel et al., Tektronix Inc., pp. 43–50.

"Efficient Alias–Free Rendering Using Bit–Masks and Look–Up Tables," Abram et al., The University of North Carolina at Chapel Hill, XP–002115680, Jul. 1985, pp. 53–59.

"A New Simple and Efficient Antialiasing with Subpixel Masks," Schlling et al., Computer Graphics, vol. 25, No. 4, Jul. 1991, pp. 133–141.

"A Multiprocessor System Utilizing Enhanced DSP's for Image Progressing," Ueda et al., XP 2028756, pp. 611–619.

"The Reyes Image Rendering Architecture," Cook et al., Computer Graphics, vol. 21, No. 4, Jul. 1987, pp. 95–102.

"The Accumulation Buffer: Hardware Support for High–Quality Rendering," Haeberli et al., Computer Graphics, vol. 24, No. 4, Aug. 1990, pp. 309–318.

"Advanced Animation and Rendering Techniques," Watt et al., ACM Press, New York, New York, pp. 127–137.

The A–Buffer, an Antialiased Hidden Surface Method, Carpenter, Loren, Computer Graphics, vol. 18, No. 3, Jul. 1984, pp. 13–18.

Patent Abstracts of Japan, Vol, 1996, No. 02, Feb. 29, 1996 and JP 07 281653 A (Matshushita Electric Ind. Co. Ltd.), Oct. 27, 1995, Abstract.

* cited by examiner

GRAPHICS PROCESSOR FOR STEREOSCOPICALLY DISPLAYING A GRAPHICAL IMAGE

PRIORITY

This application claims priority from provisional U.S. patent application Ser. No. 60/127,789, filed Apr. 5, 1999, entitled "GRAPHICS PROCESSOR FOR STEREOSCOPICALLY DISPLAYING A GRAPHICAL IMAGE" and the disclosure of which is incorporated herein, in its entirety, by reference.

FIELD OF THE INVENTION

The invention generally relates to computer systems and, more particularly, the invention relates to processing graphics request data for stereoscopic display on a computer display device.

BACKGROUND OF THE INVENTION

Images may be stereoscopically drawn on a display device in accord with many well known techniques. Among those techniques is one in which a first set of (horizontal) lines on the display is directed to a viewer's right eye, while a second set of different lines on the display is directed the viewer's left eye. For example, every odd line may be directed to the viewer's left eye only, while every even line may be directed to the viewer's right eye only. To stereoscopically view an image utilizing this technique, the viewer generally must wear a pair of polarized glasses that blocks the first set of lines from view by the left eye, and similarly blocks the second set of lines from view by the right eye. The combined effect viewed by both eyes produces the stereoscopic image.

As is known in the art, many conventionally known computer graphical application program interfaces, such as the OPENGL™ API (available from Silicon Graphics, Inc. of Mountain View, Calif.), break an image into a plurality of primitive shapes ("primitives"), such as lines and points, to display the image. Each primitive of the image is rendered to produce the final displayed image. Display problems a rise, however, when primitives are stereoscopically drawn across a small, odd number of lines of the display device. For example, only one eye of a viewer will see a horizontal line (i.e., drawn on one line of the display device), while the other eye will not see such line. This distorts the ultimate stereoscopic image, thus degrading the visual effect of the display.

Figure 1:
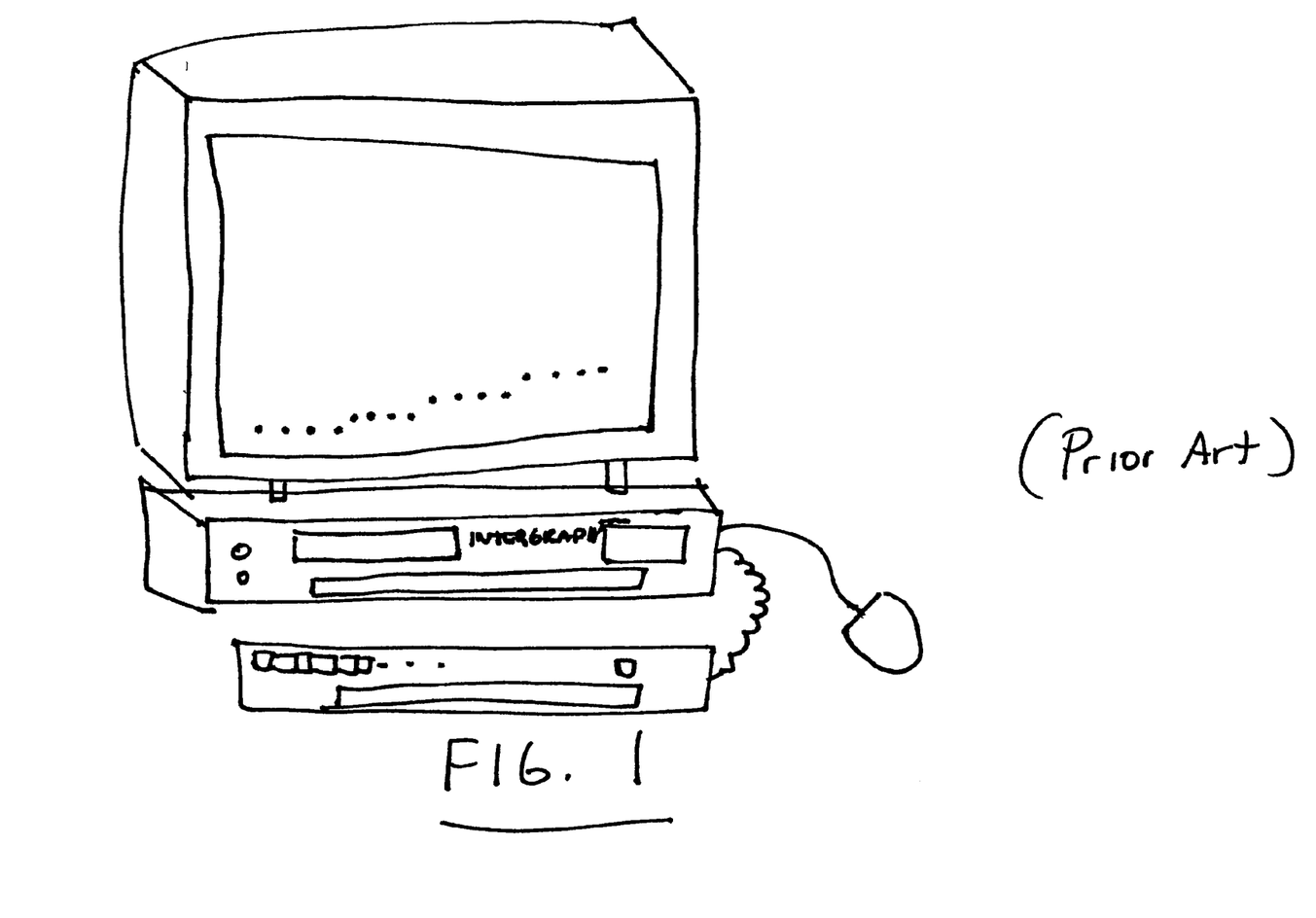
FIG. 1 schematically shows an exemplary diagonal line primitive displayed on a prior art computer system.

In a similar manner, because of commonly known aliasing problems, a line drawn at less than or equal to a forty-five degree angle from the horizontal of a display device also is distorted. As shown in FIG. 1, such a line often lights several consecutive pixels in each of several lines to create a stair effect. Each eye thus sees every other part of the line, effectively creating the illusion of a discontinuous line.

SUMMARY OF THE INVENTION

In accordance with one aspect of the invention, a method, computer program product, and graphics processor for stereoscopically displaying a primitive on a display device adds a row of pixels to the primitive to improve its appearance on the display device. To that end, it first is determined if the primitive is to be stereoscopically displayed on the display device. After it is determined that the primitive is to be stereoscopically displayed, then a row of pixels is added to the primitive. The primitive preferably is a point primitive or a line primitive.

In accordance with another aspect of the invention, a method and apparatus improves the appearance of a graphical image for subsequent display on a display device. The graphical image is comprised of a plurality of primitives that each have an associated width. Accordingly, graphics request code representing the plurality of primitives;is received. It then is determined if the plurality of primitives are to be displayed in a stereoscopic display mode. If the plurality of primitives is determined to be in the stereoscopic display mode, then the width is increased, by one pixel, of a set of the plurality of primitives.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

In accordance with preferred embodiments of the invention, point and various line primitives that are to be stereoscopically displayed are modified to include an additional row of pixels. This modification reduces the distortion of a graphical image that is made up of the primitives being modified, thus more accurately displaying the graphical image.

Figure 2A:
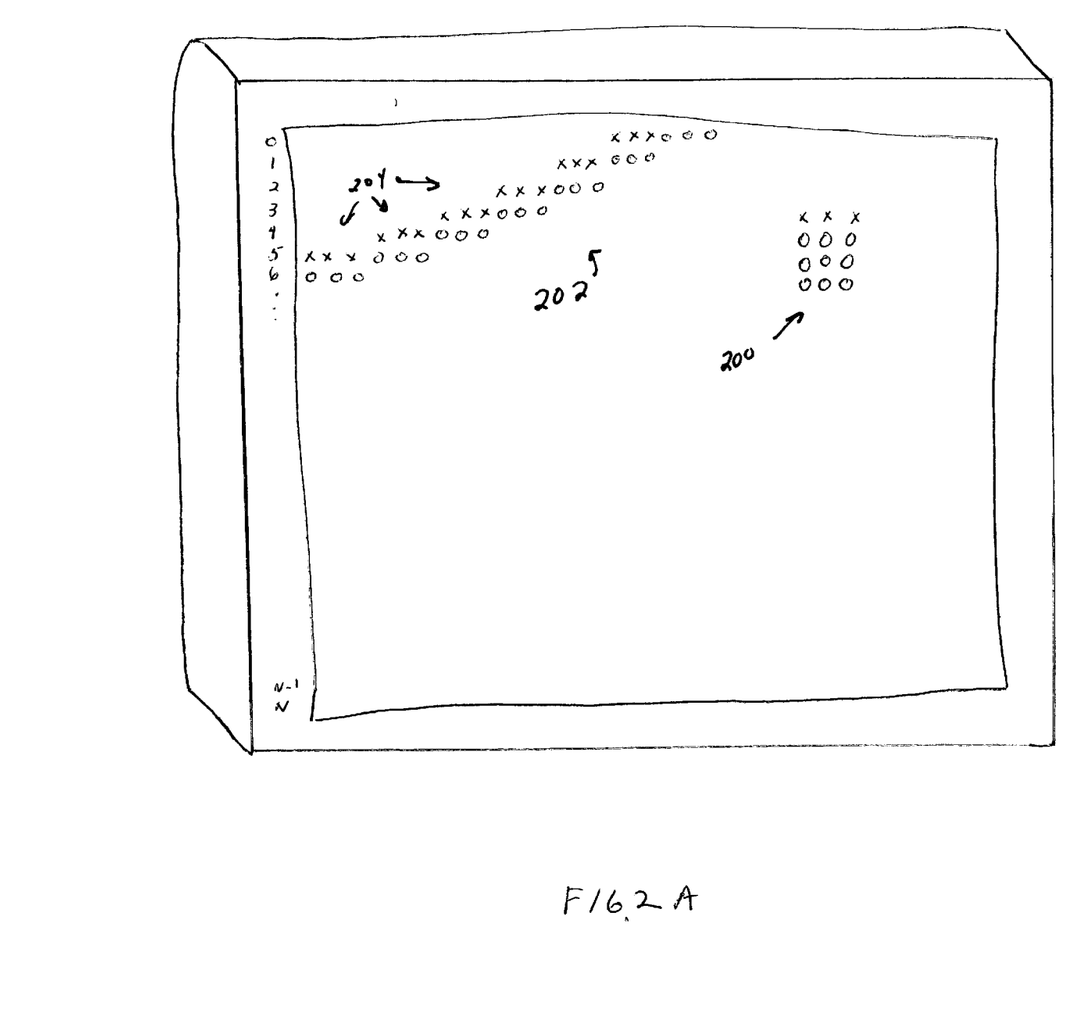
FIG. 2A schematically shows a display device displaying a point primitive and a diagonal line primitive in accordance with preferred embodiments of the invention.
Figure 2B:
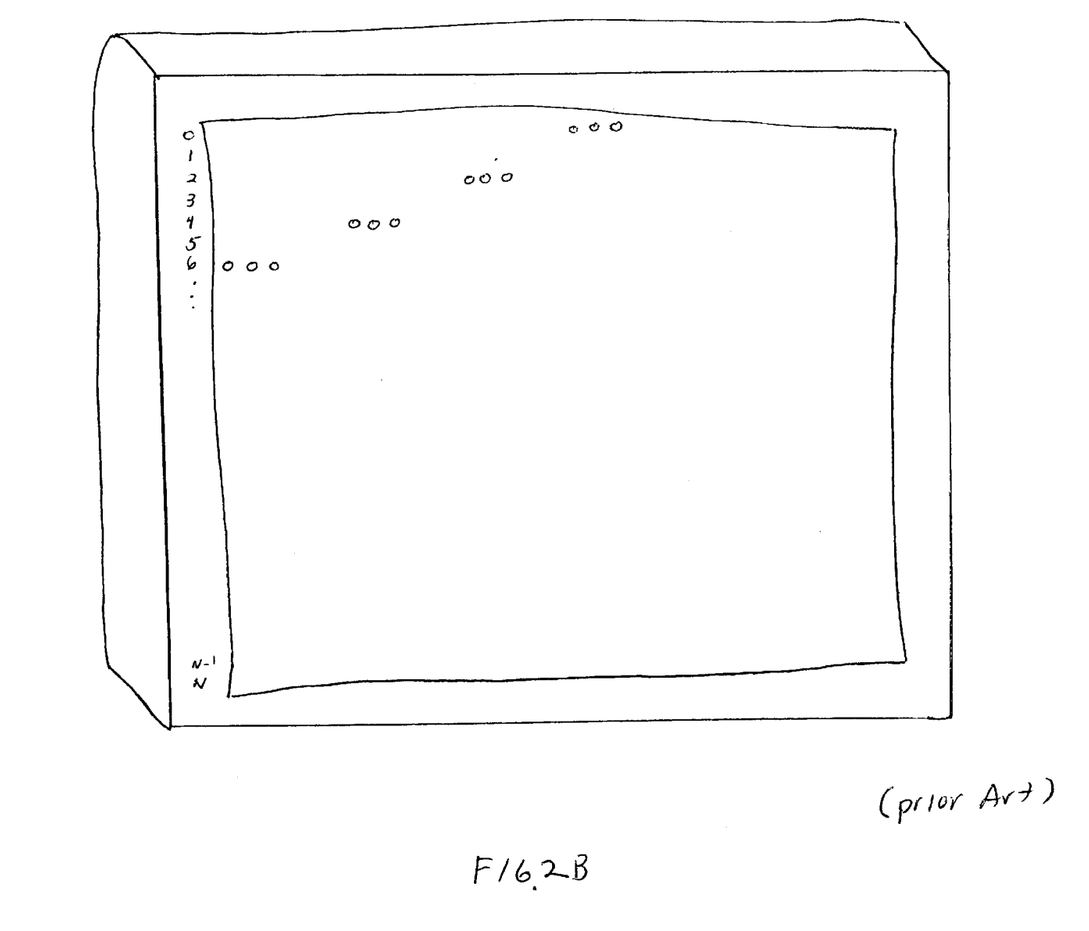
FIG. 2B schematically shows the view by one eye of the diagonally oriented line primitive in FIG. 2A when such primitive is not displayed in accord with preferred embodiments.
Figure 2C:
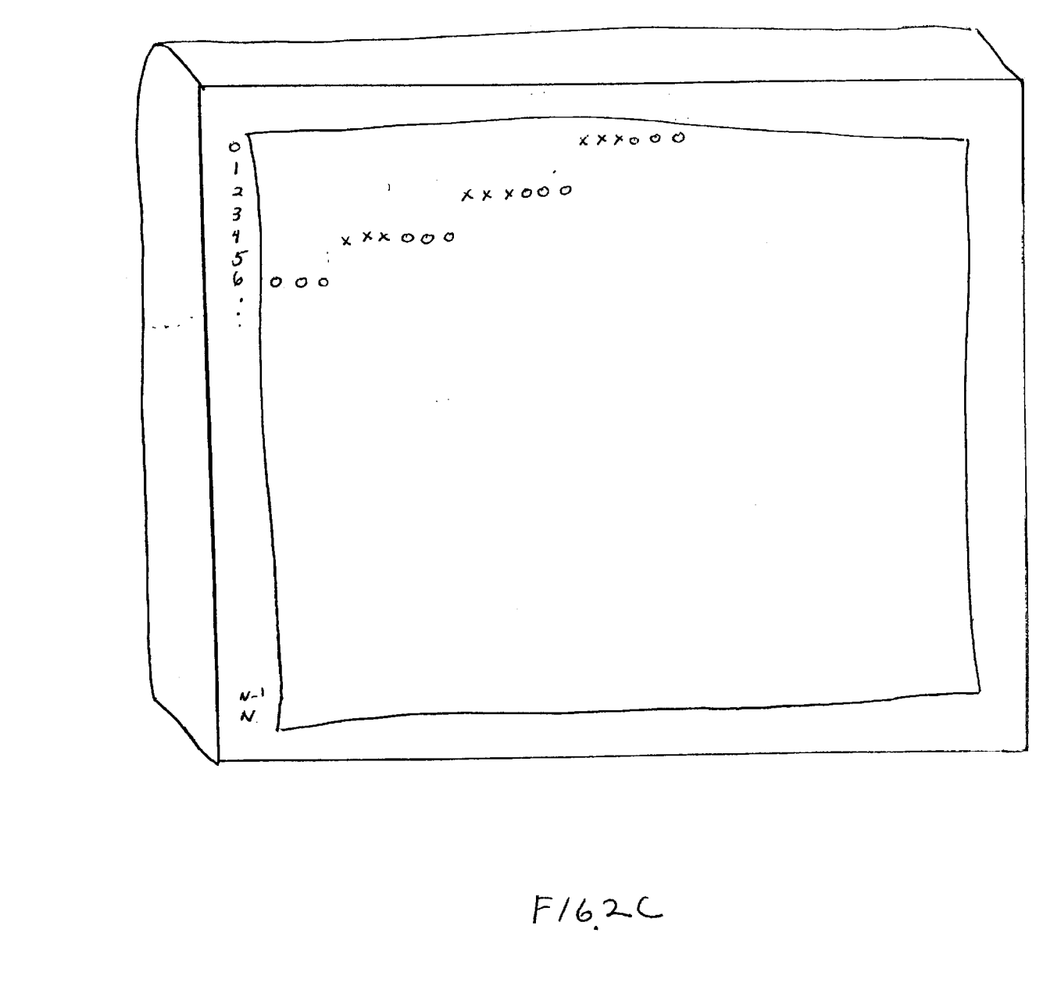
FIG. 2C schematically shows the view by one eye of the diagonally oriented line primitive in FIG. 2A when such primitive is displayed in accordance with preferred embodiments.

FIG. 2A schematically shows a display device displaying both a point primitive 200 and a diagonally oriented line primitive 202 in accordance with preferred embodiments of the invention. It should be noted that the pixels in FIGS. 2A–2C are substantially enlarged for illustrative purposes only. The line primitive 202 in the figures is oriented at a forty-five degree angle to the horizontal and thus, has a jagged, stair-case look due to aliasing problems. In preferred embodiments, line primitives 202 forming angles between zero and forty-five degrees against the horizontal are modified as discussed below for stereoscopic display on a display device.

It should be noted that although rows and columns, as well as horizontal and vertical dimensions are discussed, various embodiments are applicable to their converse. For example, if a display device is utilized with an electron gun that lights pixels by columns and not rows (i.e., in a column-by-column manner), then those skilled in the art should be able to apply principles of preferred embodiments to such display device to produce the desired results. Accordingly, principles of various embodiments can be applied to a conventional display device oriented on its side. Preferred embodiments nevertheless are discussed in terms of a display device having an electron gun that lights pixels in a row-by-row manner.

As known in the art, line primitives 202 include either more (vertical) columns (of pixels) than (horizontal) rows, or more rows than columns. A line primitive 202 is considered to be oriented in the X-direction when it has more columns than rows (i.e., more pixels are lit in the X-direction than in the Y-direction). As also is known in the art, a point primitive 200 has an identical number of rows and columns. The point primitive 200 shown in FIG. 2A, for example, is a three-by-three point primitive 200 since it has three rows and three columns. Each of the rows and columns in the displayed point primitive 200 thus has three pixels.

Each pixel represented by a "o" in FIGS. 2A–2C is lit even when the primitives are not modified in accord with preferred embodiments of the invention. Conversely, each pixel represented by an "x" in FIGS. 2A and 2C is lit in accord with preferred embodiments of the invention. The addition of the "x" pixels.enables a person viewing the point primitive 200 in FIG. 2A to see two rows with the right eye, and two rows with the left eye. In a similar manner, the addition of the "x" pixels to the aliased line primitive 202 has the effect of visually smoothing out the steps 204 of the line. Specifically, the addition of the "x" pixels enables the right and left eyes to each see a smoother transition between the previous row of lit pixels respectively directed to each eye.

FIGS. 2B and 2C graphically exemplify the difference between line primitives 202 displayed in accord with the prior art (FIG. 2B), and those displayed in accord with preferred embodiments of the invention (FIG. 2C). Both of those figures show the displayed line primitive 202 of FIG. 2A as seen by one eye. FIG. 2B shows a prior art display of the line primitive 202 where only three pixels are lit for each step 204. This leaves a relatively large gap between each of the steps 204 of the line primitive 202, consequently producing a relatively distorted view. FIG. 2C, however, adds "x" pixels between the steps 204, consequently blending each of the steps 204 to reduce the aliasing effect.

Figure 3:
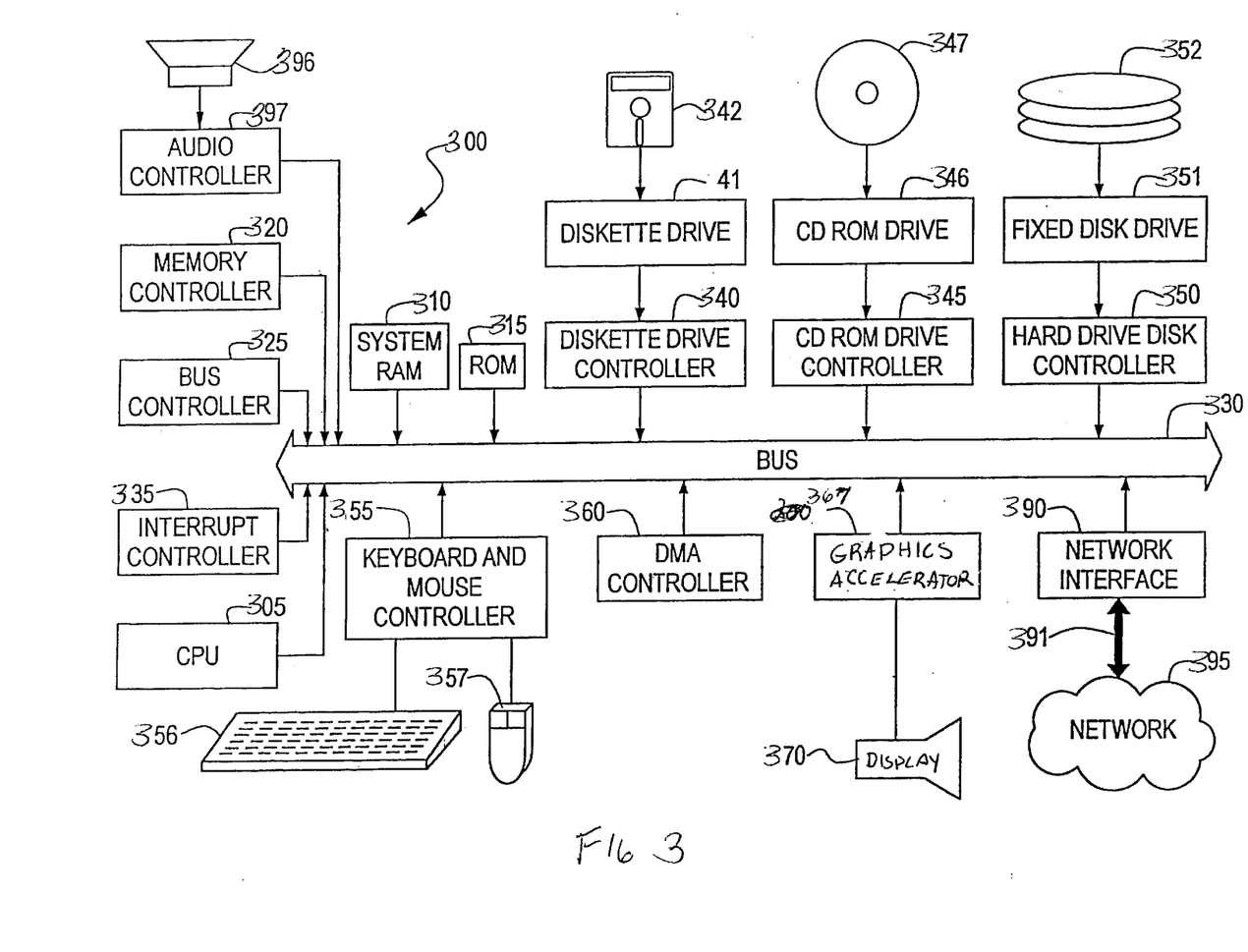
FIG. 3 schematically shows an exemplary computer system on which preferred embodiments of the invention may be implemented.

FIG. 3 illustrates the system architecture for an exemplary computer system 300, such as an Intergraph EXTREME-Z™ graphics workstation (distributed by Intergraph Corporation of Huntsville, Ala.), on which preferred embodiments of the invention can be implemented. The exemplary computer system of FIG. 3 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 3.

The computer 300 includes a central processing unit (CPU) 305 having a conventional microprocessor, random access memory (RAM) 310 for temporary storage of information, and read only memory (ROM) 315 for permanent storage of read only information. A memory controller 300 is provided for controlling system RAM 310. A bus controller 325 is provided for controlling a bus 330, and an interrupt controller 335 is provided for receiving and processing various interrupt signals from the other system components.

Mass storage may be provided by known non-volatile storage media, such as a diskette 342, a digital versatile disk (not shown), a CD-ROM 347, or a hard disk 352. Data and software may be exchanged with the computer system 300 via removable media, such as the diskette 342 and the CD-ROM 347. The diskette 342 is insertable into a diskette drive 341, which utilizes a diskette drive controller 340 to interface with the bus 330. Similarly, the CD-ROM 347 is insertable into a CD-ROM drive 346, which utilizes a CD-ROM drive controller 345 to interface with the bus 330. Finally, the hard disk 352 is part of a fixed disk drive 351, which utilizes a hard drive controller 350 to interface with the bus 330.

User input to the computer 300 may be provided by a number of devices. For example, a keyboard 356 and a mouse 357 may be connected to the bus 330 by a keyboard and mouse controller 355. An audio transducer 396, which may act as both a microphone and a speaker, is connected to the bus 330 by audio controller 397. It should be obvious to those reasonably skilled in the art that other input devices, such as a pen and/or tablet, may be connected to computer 300 through bus 330 and an appropriate controller. A direct memory access (DMA) controller 360 is provided for performing direct memory access to system RAM 310. A visual display may be generated by a video controller 365, which controls a graphics accelerator 367 and a display device 370. In preferred embodiments, the graphics accelerator 367 includes a WILDCAT™ video card, available from Intergraph Corporation. As is known in the art, the WILDCAT™ video card is configured for use with the OPENGL™ application program interface ("API") for rendering three dimensional ("3D") images on the display device 370. The OPENGL™ API also may be utilized to stereoscopically display an item in accord with preferred embodiments of the invention.

A network adapter 390 also may be included to enable the computer system 300 to be interconnected to a network 395 via a network bus 391. The network 395, which may be a local area network (LAN), a wide area network (WAN), or the Internet, may utilize general purpose communication lines that interconnect a plurality of network devices.

The computer system 300 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services.

Figure 4:
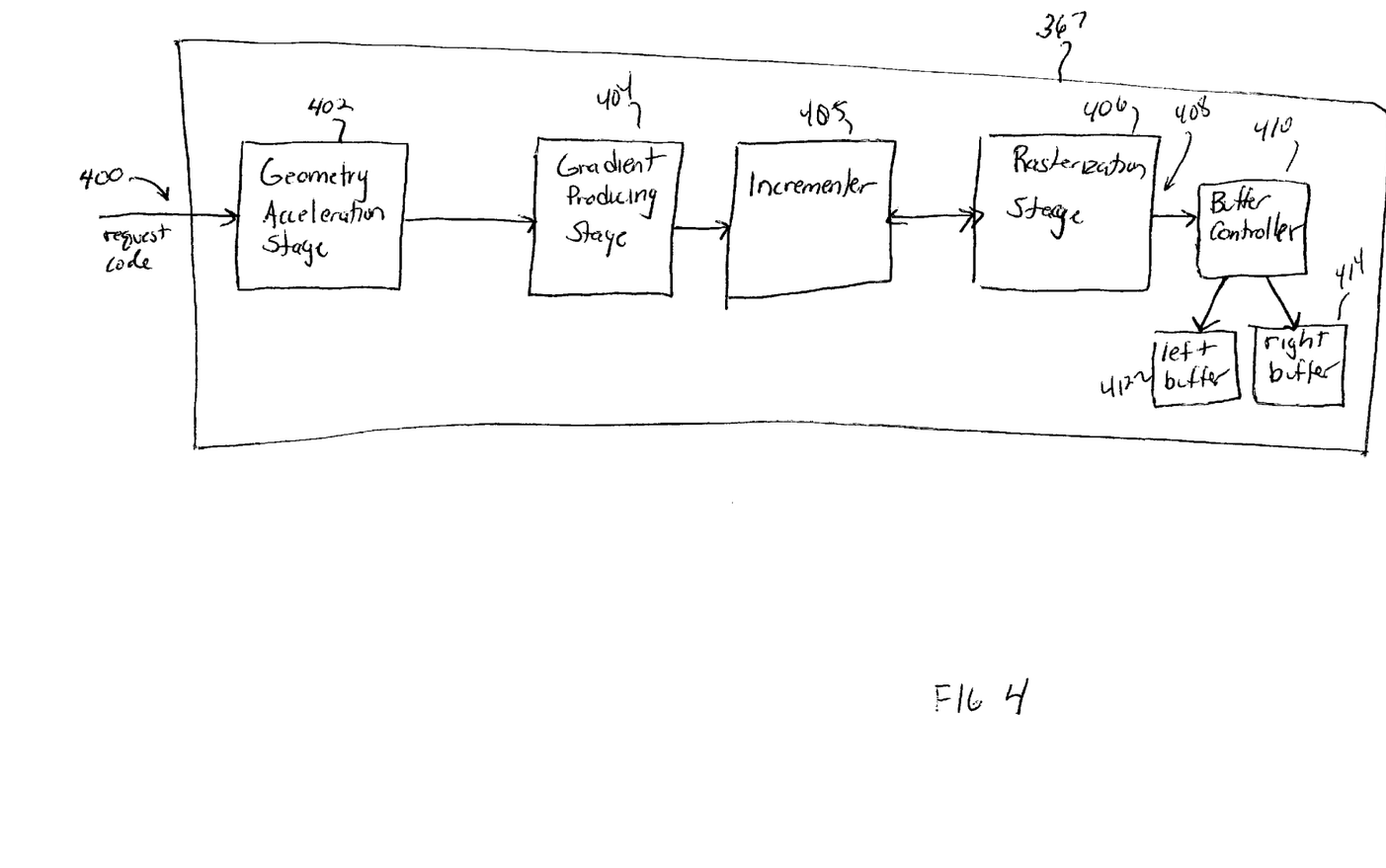
FIG. 4 schematically shows several of the internal components of a graphics accelerator that may be utilized with preferred embodiments of the invention.

FIG. 4 schematically shows several of the internal components of the graphics accelerator 367 shown in FIG. 3. In particular, the graphics accelerator 367 includes an input 400 for receiving graphics request code from the CPU 305, a geometry acceleration stage 402 for performing geometry acceleration on primitive vertices, a gradient producing stage 404 for producing gradients between primitive vertices, an incrementer 405 for adding pixels to selected primitives for improving their display, and a rasterization stage 406 for rasterizing the primitives. The rasterization stage 406 includes an output 408 to a frame buffer controller 410 that directs pixel data to either one of a left frame buffer 412 or a right frame buffer 414. The left frame buffer 412 includes data to be seen by a viewer's left eye, while the right frame buffer 414 includes data to be seen by a viewer's right eye.

The geometry, acceleration stage 402 preferably is similar to that described in copending U.S. patent application Ser. No. 09/353,495, filed Jul. 15, 1999, the disclosure of which is incorporated herein, in its entirety, by reference. In a similar manner, the gradient producing stage 404 and rasterization stage 406 preferably are similar to those described in copending U.S. Provisional Patent application No. 09/353,420, filed Jul. 15, 1999, the disclosure of which also is incorporated herein, in its entirety, by reference. In alternative embodiments, each stage of the graphics accelerator 367 is a single application specific integrated circuit that is configured to perform its specified function. Each stage of the graphics accelerator 367 may include one or more processing units for performing such stage's desired function.

In preferred embodiments, one or more rasterizers in the rasterization stage 406 are utilized with one or more incrementers 405 for.stereoscopically displaying a graphical image in accordance preferred embodiments of the invention. Moreover, the incrementers 405 may be located within one gradient producing unit, or distributed across several gradient producing units. Alternatively, the incrementers 405 may be external to the gradient producing units.

Figure 5:
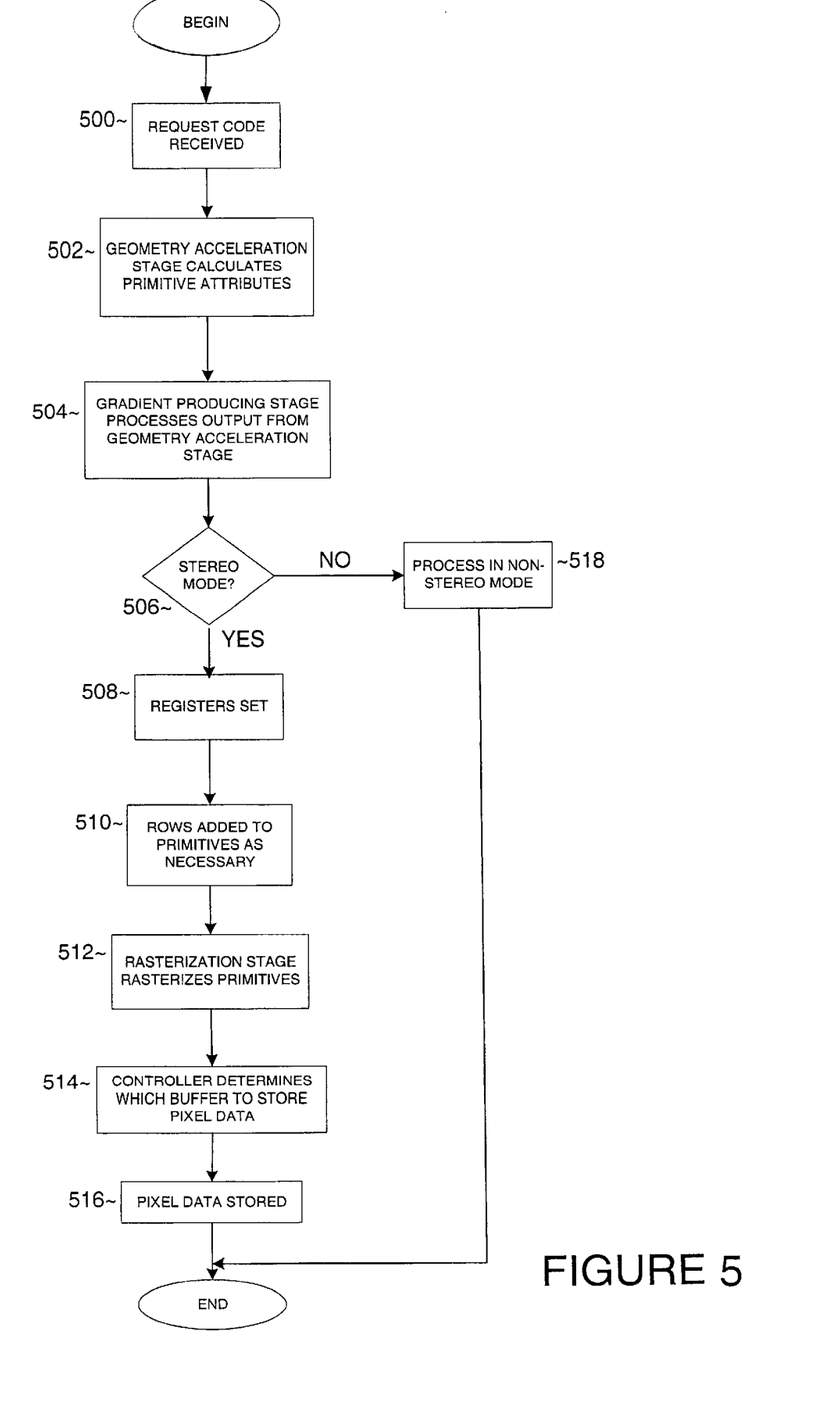
FIG. 5 shows a process of rasterizing point and line primitives in accordance with preferred embodiments of the invention.

FIG. 5 shows a process of rasterizing point and line primitives of a graphical image in accord with preferred embodiments of the invention. The process begins at step 500 in which graphics request code (e.g., in the OPENGL™ format) is received at the input 400 of the graphics accelerator 367. The graphics request code preferably represents an image to be displayed on the display device that is defined by a plurality of primitives. Among those primitives are point and line primitives.

Once received, the geometry acceleration stage 402 calculates vertex attributes for the received point and line primitive request code in accord with conventional processes (step 502). In the case of a line primitive, the attribute values for the end-points of the line are calculated. In the case of a point primitive, the attribute values of the entire point primitive are calculated. Among the attributes calculated for each primitive are length and width values, which are defined in terms of pixels on the display device. The exact pixels on the display device to be lit for a primitive being processed, however, are not determined until such primitive is processed by the rasterization stage 406.

The request code (i.e., the originally received graphics request code and the vertex attribute data) then is forwarded to the gradient producing stage 404 for calculating gradient functions ("gradients") between endpoints of the primitives in accord with conventional processes (step 504). In the case of a line primitive, the gradients define the rate of change of attributes (e.g., color, transparency, etc . . . )between the line endpoints as a function of position. In the case of a point primitive, however, it is preferred that no gradients be produced since most significant attribute data was calculated by the geometry stage at step 502. After the gradients (if any) are produced, then the request code (i.e., the originally received graphics request code, the vertex attribute data, and gradient(s)) is forwarded to the incrementer 405 for additional processing.

After receiving the request code, the incrementer 405 determines at step 506 if the graphics request code is to be processed in a "stereo" mode. Specifically, the graphics request code is preceded by a header having a field indicating whether or not request code following the control header is to be processed in the stereo mode. Accordingly, the incrementer 405 examines the header to determine if processing is to be in the stereo mode.

If determined to be in the stereo mode, then the process continues to step 508, in which one or more primitive processing register(s) (not shown) within the incrementer 405 are set in accord with the requirements specified in the control header. Among those requirements, of course, is an indication as to whether the graphical image is to be displayed in the stereo mode. In preferred embodiments, when determined to be in the stereo mode, all of the code following the header is processed in stereo mode until a subsequent control header with different display requirements is received.

The primitive processing registers are configured to set the mode in which the rasterization stage 406 is to process the request code. In the case of line primitives, for example, the primitive processing registers are 32-bits wide and include, among other things, fields for the width of each line, a stipple count, stipple repeating, and a single-bit stereo mode indicator. Accordingly, when the stereo mode field is set to a high value (i.e., a "1" value when the request code header indicates stereo mode processing), then the rasterization stage 406 operates in the stereo mode (e.g., a interlaced stereo mode or frame sequential mode, each of which is discussed below). In a similar manner, in the case of point primitives, the primitive processing registers also are 32-bits wide. The fields in such primitive processing registers may include the size of the point, and a single-bit stereo mode field. Like that field for the line primitive case, the stereo mode field is set to a high value to cause the rasterization stage 406 to operate in the stereo mode on the subsequently received point primitive request code for that point primitive.

Once the registers are set, then the process continues to step 510 in which rows of pixels are added to each received primitive (i.e., the request code) as necessary (discussed below with reference to FIG. 6). In preferred embodiments, when in the stereo mode, an additional row is added to all line primitives oriented in the X-direction, and to all point primitives. When added to point primitives, the center of the point primitive is changed to reflect the additional row. Accordingly, since one row is added to the top of a point primitive (i.e., added above the row with the highest Y value), then the center of the point primitive is moved 0.5 pixels in the positive Y-direction from its original location. Although changed in the Y direction, the center maintains its location in the X direction. The center of a point primitive is subsequently utilized to determine which actual pixels on the display device are to be illuminated. Details of preferred embodiments of adding rows to line primitives oriented in the X-direction are discussed below with reference to FIG. 6.

In alternative embodiments, an additional row is added to point primitives having an odd number of rows, and to all line primitives oriented in the X-direction. In still other embodiments, additional rows of pixels are added to all line primitives oriented in the X-direction that have line segments with an odd number of rows (see, for example, FIG. 2A).

In other embodiments, the additional rows of pixels may be added by stepping across each column of the displayed line or point primitive, and adding a pixel to each column having an odd number of lit pixels. The incrementer 405 may execute these functions. For example, with a 3×3 point primitive, an additional row of three pixels may be added to the primitive (see FIG. 2A). The additional row may be added either above the top row of pixels, or below the bottom row of pixels. For the line primitive 202 shown in FIG. 2A, several of three pixels (i.e., the "x" pixels) are added immediately above each row of previously lit pixels ("o" pixels). As a further example, a single additional row of pixels may be added to a line primitive 202 that forms a zero degree angle against the horizontal. Like the other exemplary primitives, this additional row of pixels preferably is contiguous with the existing row of pixels.

After the rows of pixels are added, then the process continues to step 512 in which the modified primitives (i.e., with the extra rows of pixels) are rasterized by the rasterization stage 406 in accord with conventional processes. As previously noted, the rasterization stage 406 operates in the mode set in the primitive processing registers. To that end, the rasterization stage 406 reads the appropriate register(s) and generates pixel data that specifies attributes of specific pixels to be lit to display the primitive. The pixel data then is forwarded to the frame buffer controller 410, which determines how the pixel data for each pixel is to be stored (step 514). The appropriate frame buffer may be determined by examining a header associated with the pixel data that specifies whether the pixel is an odd or even pixel. The pixel data then is stored in the appropriate frame buffer (i.e., either the left frame buffer 412, or the right frame buffer 414) as specified by the buffer controller (step 516). Once in the specified frame buffer, the data may be displayed on the display device 370 as a stereo display.

Returning to step 506, if it is determined that the primitives are not to be processed in the stereo mode, then the process continues to step 518, in which the primitive is processed in accord with conventional non-stereo processes. After executing this step, the process skips steps 508–516, thus completing the process.

In preferred embodiments, each primitive is processed serially in accord with the process shown in FIG. 5. Accordingly, the primitive processing registers are reset as each primitive is serially received by the incrementer 405. The rasterizer stage thus processes each primitive in the order received in accord with the specifications (i.e., requirements) stored in the appropriate primitive processing register(s).

When in the stereo mode, a person viewing the display 370 should wear polarized glasses to view the indicia on the display 370 in stereo. Such glasses' are designed to ensure that the right eye can see one set of lines only (e.g., only the odd lines), while the left eye can see another, different set of lines only (e.g., only the even lines).

Figure 6:
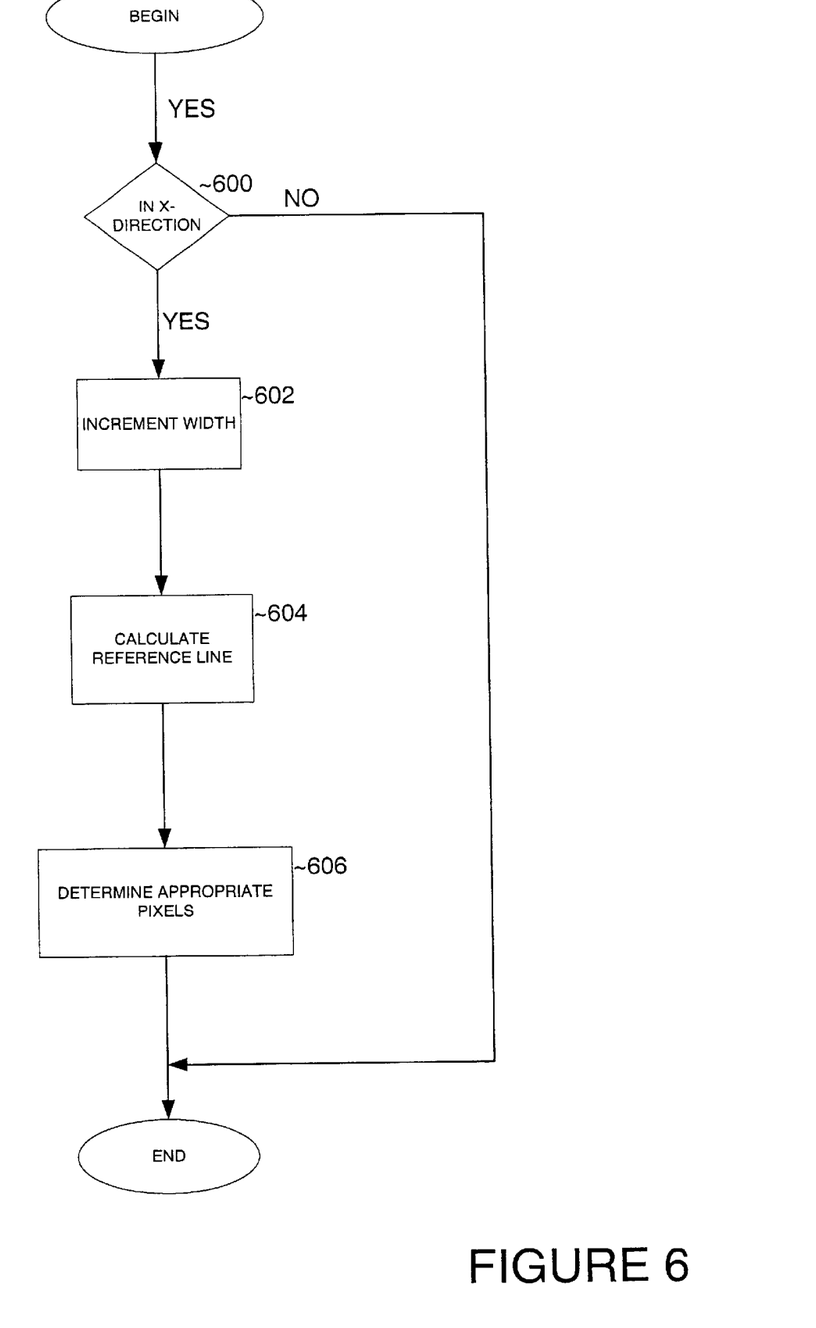
FIG. 6 shows a process of process of adding rows to line primitives in accordance with preferred embodiments of the invention.

FIG. 6 shows an exemplary process of adding rows to line primitives, as discussed in step 510 of FIG. 5. The process begins at step 600, in which it is determined if the line primitive ("subject line") is oriented in the X direction. The process ends if not oriented in the X direction and thus, no additional rows are added to the subject line.

Alternatively, if at step 600 it is determined that the subject line is oriented in the X direction, then the process continues to step 602, in which the width of the subject line is determined, and such width is incremented by one. To that end, the width of the subject line first is ascertained by accessing the primitive processing registers having that data. Once the width is determined, then it is incremented as required.

The process then continues to step 604, in which a reference line is calculated. Specifically, in preferred embodiments, the pixels utilized to light the subject line are calculated based upon the reference line (see step 606, discussed below). When using an X-Y coordinate system on the display, the reference line is calculated as having the same slope as the subject line, and the same X values. Unlike the subject line, however, the Y values of the reference line are calculated according to the below equation:

$$Y = Y_o - (\text{determined width} - 1)/2$$

where $Y_o$ is the Y value of the subject line at a given point

By way of example, the Y value of a point of the reference line that corresponds with a point (of the subject line) having the coordinates (2,3) and a determined width of 5 will thus be calculated as 3−(5−1)/2, which equals 1. Accordingly, a point having coordinates (2,3) on the subject line corresponds with a point having coordinates (2,1) on the reference line.

After the reference line is calculated, the process continues to step 606, in which the appropriate pixels to be lit at a subsequent time (steps 512–516 of the process in FIG. 5) are determined for the subject line. Once determined, the coordinates of these pixels are stored. To that end, the X-Y coordinates of each pixel through which the reference line passes first is determined. When the reference line passes through two pixels having the same X value, however, then the pixel having the lower Y value is utilized (i.e., such pixel's X-Y coordinates are utilized). The coordinates of these pixels then are stored to be subsequently lit (i.e., steps 512 to 516 of the process of FIG. 5), as well as the coordinates of various other pixels immediately above them (i.e., in the positive Y direction) up to the determined width.

Continuing with the above example, if one of the pixels intersecting the reference line (having a determined width of 5) is located at coordinates (2,1), then that pixel is stored, as well as the four pixels immediately following such pixel in the positive Y direction. Specifically, in addition to pixel (2,1), the coordinates of pixels (2,2), (2,3), (2,4), and (2,5) are stored. These pixels make up one column of pixels for the subject line.

It should be noted that although the reference line is below the subject line (i.e., in the negative Y direction), this process also can be utilized in a corresponding manner if the reference line is above the subject line (i.e., in the positive Y direction). Accordingly, when storing coordinates of pixels in this case, the coordinates of the intersected pixels are stored, as well as the coordinates of the other pixels in each respective column to be stored are immediately below the intersected pixels in the negative Y direction.

In some embodiments, if the subject line is determined to be oriented in the Y direction, then normal processing continues. Specifically, the width is not incremented and thus, steps 604 and 606 are executed utilizing the non-incremented width.

Principles of preferred embodiments of the invention may be applied to other types of primitives, such as triangle and rectangle primitives. In a similar manner, preferred embodiments of the invention may be applied directly to graphical images that are not broken up into primitives. Accordingly, discussion of applying preferred embodiments of the invention to primitives is for exemplary purposes only and is not intended to limit the scope of the invention.

The display 370 may be any conventional type of display device that utilizes an electron gun for scanning the lines of the display. For example, the display 370 can be a cathode ray tube monitor, such as a INTERVIEW™ 24HD96 color monitor, distributed by Intergraph Corporation of Huntsville, Ala. In general terms, however, the display 370 can be any display device that displays output graphical indicia in a series of lines. Accordingly, this includes liquid crystal displays, and head mounted display devices.

As suggested above, the display 370 may be configured to operate in one of two different stereo modes; namely interlaced stereo mode and frame sequential mode. When in the interlaced stereo mode, the electron gun draws every other line per frame of graphical data. For example, the electron gun sequentially illuminates the even lines first, followed by the odd lines, followed by the even lines, etc . . . This process is very similar to conventional television video broadcast techniques, such as those defined by the National Television Standards Committee (known as "NTSC format"), or the Phase Alternating Line format (known as "PAL format"). Conversely, when in the frame sequential mode, all lines are illuminated for each frame. For example, the first line is illuminated first, followed by the second line, and then the third line, etc . . . until the last line is illuminated. The process then repeats after the last line is illuminated. Although the frame sequence mode produces better visual output, it requires more memory than is required in the interlaced stereo mode. Accordingly, each stereo mode is utilized as dictated by system requirements.

In an alternative embodiment, the disclosed apparatus and method for stereoscopically displaying graphical images may be implemented as a computer program product for use with a computer system. Such implementation may include a series, of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A graphics processor for preparing a primitive for display on a display device, the display device having a plurality of rows and columns of pixels, the graphics processor comprising:
    an input that receives a message indicating that the primitive is to be stereoscopically displayed on the display device; and
    an incrementer operatively coupled with the input, the incrementer adding a row of pixels to the primitive after the input receives the message.

2. The graphics processor as defined by claim 1 wherein the primitive is a line primitive oriented in the X-direction.

3. The graphics processor as defined by claim 2 wherein the line primitive is aliased to include a plurality of steps, wherein the incrementer adds one additional row of pixels to each of the plurality of steps of the line primitive.

4. The graphics processor as defined by claim 1 wherein the message is a header of graphics request code.

5. The graphics processor as defined by claim 1 wherein the primitive is a point primitive.

6. The graphics processor as defined by claim 5 further comprising:
    a counting processor that counts the number of rows in the point primitive to produce a row count.

7. The graphics processor as defined by claim 6 wherein the incrementer adds a row of pixels to the point primitive if the row count is an odd number only.

8. The graphics processor as defined by claim 7 wherein the incrementer does not add a row of pixels to the point primitive if the row count is an even number.

9. A method of preparing a primitive for display on a display device, the display device having a plurality of rows and columns of pixels, the method comprising:
    determining that the primitive is to be stereoscopically displayed on the display device; and
    adding a row of pixels to the primitive after it is determined that the primitive is to be stereoscopically displayed on the display device.

10. The method as defined by claim 9 wherein the primitive is a line primitive oriented in the X-direction.

11. The method as defined by claim 10 wherein the line primitive is aliased to include a plurality of steps, wherein one additional row of pixels is added to each of the plurality of steps of the line primitive.

12. The method as defined by claim 9 wherein the primitive is determined to be in stereo mode if a header is received that includes data indicating that the primitive is to be stereoscopically displayed.

13. The method as defined by claim 9 wherein the primitive is a point primitive.

14. The method as defined by claim 13 further comprising:
    counting the number of rows in the point primitive to produce a row count.

15. The method as defined by claim 14 a row of pixels is added to the point primitive if the row count is an odd number only.

16. A computer program product for use on a computer system for preparing a primitive for display on a display device, the display device having a plurality of rows and columns of pixels, the computer program product comprising a computer usable medium having computer readable program code thereon, the computer readable program code comprising:
    program code for determining that the primitive is to be stereoscopically displayed on the display device; and program code for adding a row of pixels to the primitive after it is determined that the primitive is to be stereoscopically displayed on the display device.

17. The computer program product as defined by claim 16 wherein the primitive is a line primitive oriented in the X-direction.

18. The computer program product as defined by claim 17 wherein the line primitive is aliased to include a plurality of steps, wherein one additional row of pixels is added to each of the plurality of steps of the line primitive.

19. A method of improving the visual appearance of a graphical image for subsequent display on a display device having a plurality of pixels, the graphical image being comprised of a plurality of primitives, each primitive having an associated width, the method comprising:

receiving graphics request code representing the plurality of primitives;

determining if the plurality of primitives are to be displayed in a stereoscopic display mode; and increasing the width, by one pixel, of a set of the plurality of primitives if the plurality of primitives is determined to be in the stereoscopic display mode.

20. The method as defined by claim 19 further including:

processing the set of the plurality of primitives for stereo display on a display device.

21. The method as defined by claim 19 wherein the set of the plurality of primitives includes a point primitive.

22. The method as defined by claim 19 wherein the set of the plurality of primitives includes a line primitive oriented in the X-direction.

23. The method as defined by claim 19 wherein the display device includes an electron gun having a scan direction, the width of the primitives being transverse to the scan direction of the display device.

24. A computer program product for use on a computer system for improving the visual appearance of a graphical image for subsequent display on a display device having a plurality of pixels, the graphical image being comprised of a plurality of primitives, each primitive having an associated width, the computer program product comprising a computer usable medium having computer readable program code thereon, the computer readable program code comprising:

program code for receiving graphics request code representing the plurality of primitives;

program code for determining if the plurality of primitives are to be displayed in a stereoscopic display mode; and program code for increasing the width, by one pixel, of a set of the plurality of primitives if the plurality of primitives is determined to be in the stereoscopic display mode.

25. The computer program product as defined by claim 24 further including:

program code for processing the set of the plurality of primitives for stereo display on a display device.

26. The computer program product as defined by claim 24 wherein the set of the plurality of primitives includes a point primitive.

27. The computer program product as defined by claim 24 wherein the set of the plurality of primitives includes a line primitive oriented in the X-direction.

28. The computer program product as defined by claim 24 wherein the display device includes an electron gun having a scan direction, the width of the primitives being transverse to the scan direction of the display device.

29. A apparatus for improving the visual appearance of a graphical image for subsequent display on a display device having a plurality of pixels, the graphical image being comprised of a plurality of primitives, each primitive having an associated width, the apparatus comprising:

an input that receives the graphics request code representing the plurality of primitives;

a stereo module operatively coupled with the input, the stereo module determining if the plurality of primitives are to be displayed in a stereoscopic display mode; and an incrementer operatively coupled with the stereo module, the incrementer increasing the width, by one pixel, of a set of the plurality of primitives if the plurality of primitives is determined to be in the stereoscopic display mode.

30. The apparatus as defined by claim 29 further including:

a processor operatively coupled with the incrementer, the processor processing the set of the plurality of primitives for stereo display on a display device.

31. The apparatus as defined by claim 29 wherein the set of the plurality of primitives includes a point primitive.

32. The apparatus as defined by claim 29 wherein the set of the plurality of primitives includes a line primitive oriented in the X-direction.

33. The apparatus as defined by claim 29 wherein the display device includes an electron gun having a scan direction, the width of the primitives being transverse to the scan direction of the display device.

* * * * *